US006601196B1

(12) United States Patent
Dabral et al.

(10) Patent No.: US 6,601,196 B1
(45) Date of Patent: Jul. 29, 2003

(54) METHOD AND APPARATUS FOR DEBUGGING TERNARY AND HIGH SPEED BUSSES

(75) Inventors: Sanjay Dabral, Palo Alto, CA (US); Ramesh Senthinathan, Folsom, CA (US); Ming Zeng, San Jose, CA (US); Keith Self, Aloha, CA (US); Ernest Khaw, Beaverton, OR (US); Chung-Wai Yue, Worchester, MA (US)

(73) Assignee: Intel Corporation, Santa Clara, CA (US)

( * ) Notice: Subject to any disclaimer, the term of this patent is extended or adjusted under 35 U.S.C. 154(b) by 512 days.

(21) Appl. No.: 09/608,449

(22) Filed: Jun. 29, 2000

(51) Int. Cl.$^7$ ................................. G06F 11/00
(52) U.S. Cl. ....................................... 714/43
(58) Field of Search .................... 714/43, 45, 48, 714/56, 31, 39, 44, 18, 712, 742; 710/20, 21, 15

(56) References Cited

U.S. PATENT DOCUMENTS

| | | | | |
|---|---|---|---|---|
| 5,701,409 A | * | 12/1997 | Gates ..................... | 395/183.17 |
| 5,729,678 A | * | 3/1998 | Hunt et al. ............. | 395/183.19 |
| 5,978,934 A | * | 11/1999 | Gates ..................... | 714/41 |
| 5,978,938 A | * | 11/1999 | Kaiser et al. ........... | 714/48 |
| 6,182,248 B1 | * | 1/2001 | Armstrong et al. ..... | 714/43 |
| 6,341,358 B1 | * | 1/2002 | Bagg et al. ............. | 714/43 |
| 6,480,978 B1 | * | 11/2002 | Roy et al. ............... | 714/724 |
| 6,499,121 B1 | * | 12/2002 | Roy et al. ............... | 714/724 |

OTHER PUBLICATIONS

Randy Mooney, et al., "*A 900 Mb/s Bidirectional signaling Scheme*", IEEE Journal of Solid–State Circuits, vol. 30, No. 12, Dec. 1995, pp. 1538–1543.

Randy Mooney, et al., "*WP 2.4: A 900 Mb/s Bidirectional Signaling Scheme*", ISSCC95/Session 2/Data Communication/Paper WP 2.4, 1995 IEEE International Solid–State Circuits Conference, 3 pgs.

Toshiro Takahashi, et al., "*WP 2.5: A CMOS Gate Array With 600Mb/s Simultaneous Bidirectional I/O Circuits*", ISSCC95/Session 2/Data Communications/Paper WP 2.5, 1995 IEEE International Solid–State Circuits Conference, pp. 40–41.

* cited by examiner

*Primary Examiner*—Nadeem Iqbal
(74) *Attorney, Agent, or Firm*—Blakely, Sokoloff, Taylor & Zafman LLP

(57) ABSTRACT

An apparatus and method for debugging a bus including interposing a device that monitors the data transferred between two devices on the bus such that the bus is split into two busses, with data being copied for transmission to a diagnostics device as the data is transferred between the two busses.

27 Claims, 7 Drawing Sheets

METHOD AND APPARATUS FOR DEBUGGING TERNARY AND HIGH SPEED BUSSES

FIELD OF THE INVENTION

The present invention is related to a method and apparatus for debugging high-speed busses.

ART BACKGROUND

Computer systems commonly make use of busses to transfer data between devices that include processors, storage devices and I/O devices. Many of such busses make use of one or more data lines, which are electrical conductors on which signals are used to transfer data in concert with a clock signal and/or one or more control signals.

Many busses are binary busses that make use of signals that transition between a high and a low voltage level, indicating a binary 1 or 0 value for purposes of transferring information. In the case of such busses, only one device connected thereto is able to transmit data at any one time. However, there is also a growing number of ternary busses that make use of signals that transition among a high, a low and an intermediate voltage level. On such busses, two devices connected thereto are able to transmit data to each other, substantially simultaneously, with each device employing various methods to derive the data being transmitted by the other device. By allowing both devices to substantially simultaneously transmit data, they provide the benefit of nearly doubling the rate at which data is transmitted.

Such ternary busses tend to be "point-to-point" busses, meaning that only two devices are connected to such busses. A high or low level on a given data line indicates that both devices are transmitting a high or low signal, respectively. An intermediate level indicates that one device is transmitting a high signal while the other is transmitting a low signal. However, determining which device is transmitting the high signal and which is transmitting the low signal is not possible to discern from the intermediate level signal, itself. Each device uses the data it is transmitting on each data line to derive the data that the other device is transmitting.

Since, in a ternary bus, each device must use the data it is transmitting to derive the data being received, debugging a bus to diagnose problems or confirm functionality is rendered more difficult. It is not possible for such diagnostic tools as a logic analyzer to monitor the data being transferred between two devices by the simple attachment of probes to the conductors of a bus. Furthermore, an increasing number of busses now transfer data at rates high enough that the attachment of probes to conductors of a bus will alter the electrical and/or timing characteristics of the bus such that data integrity is adversely effected or the functionality of the bus is impaired.

BRIEF DESCRIPTION OF THE DRAWINGS

The objects, features, and advantages of the present invention will be apparent to one skilled in the art in view of the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

The example embodiments of the present invention are described in the context of ternary busses coupling devices in a point-to-point configuration. However, the present invention is applicable to a variety of bidirectional busses wherein difficulties are encountered in using diagnostic devices that must be directly attached to the conductors of a bus. Furthermore, although the present invention is described in the context of busses carrying signals across rigid interconnections spanning relatively short distances between electronic components within a computer system, the present invention is also applicable to the transmission of signals across cables or other flexible interconnections spanning longer distances between electronic components of computers or other varieties of electronic devices.

Figure 1A:
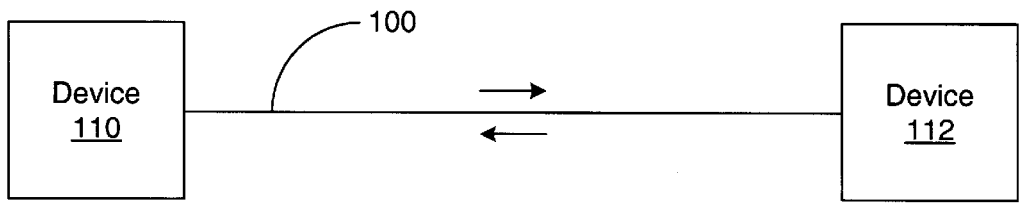
FIGS. 1a and 1b are a simplified block diagram of a device for debugging a bus.
Figure 1B:
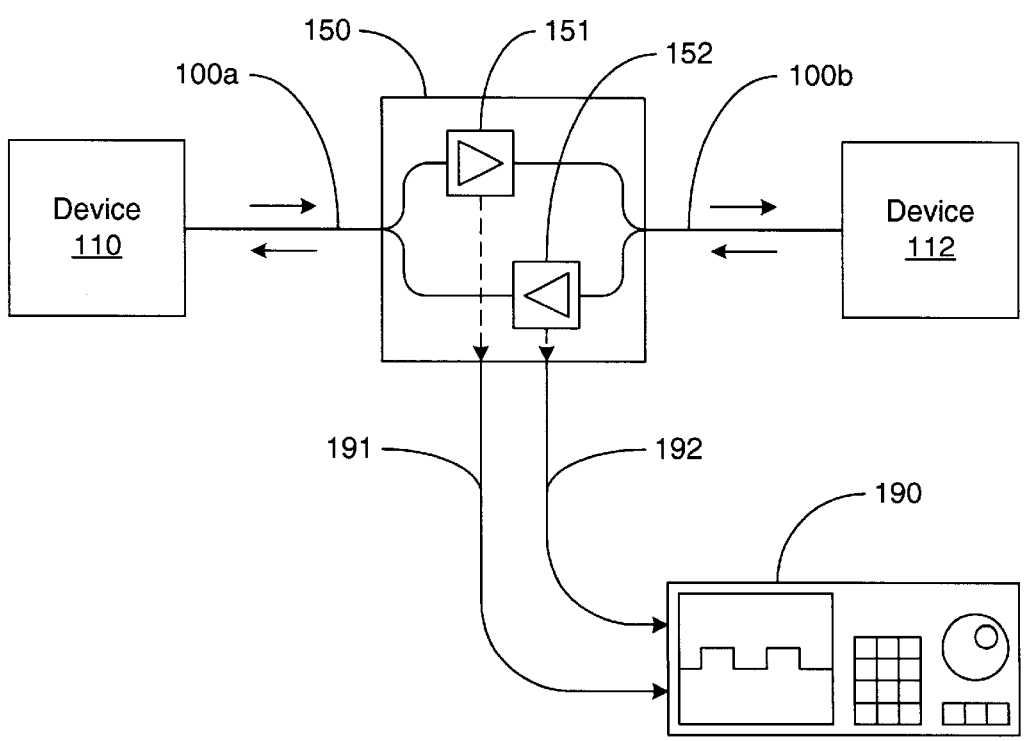

FIGS. 1a and 1b depict an embodiment of a device for debugging a bidirectional bus. Bus 100 couples devices 110 and 112. Interposer device 150 is interposed between devices 110 and 120, separating bus 100 into busses 100a and 100b. Interposer device 150 includes buffers 151 and 152 to relay signals between busses 100a and 100b. Buffers 151 and 152 also relay copies of the signals relayed between busses 100a and 100b to lines 191 and 192 that carry the copies of signals to diagnostics device 190.

In one embodiment, bus 100 is a ternary logic bus that enables the substantially simultaneous bidirectional transfer of data between devices 110 and 112 in such a way that it is not possible for a third device to derive the data being transferred by attaching probes to conductors of bus 100 and monitoring the voltage levels of those conductors. In another embodiment, bus 100 transfers data at speeds sufficiently high that it is not possible to attach probes to conductors of bus 100 without altering the electrical characteristics of those conductors such that data integrity is adversely effected, or such that timing parameters required for normal operation of the bus are violated. In still another embodiment, bus 100 is a ternary logic bus enabling substantially simultaneous bidirectional transfers at speeds sufficiently high that both difficulties are encountered when attaching probes to conductors of bus 100.

Busses 100a and 100b continue to transfer data at substantially the same rate at which bus 100 transferred signals before interposer device 150 was interposed between device 110 and 120. Buffers 151 and 152 relay signals between busses 100a and 100b with a delay that is substantially equal.

Figure 2:
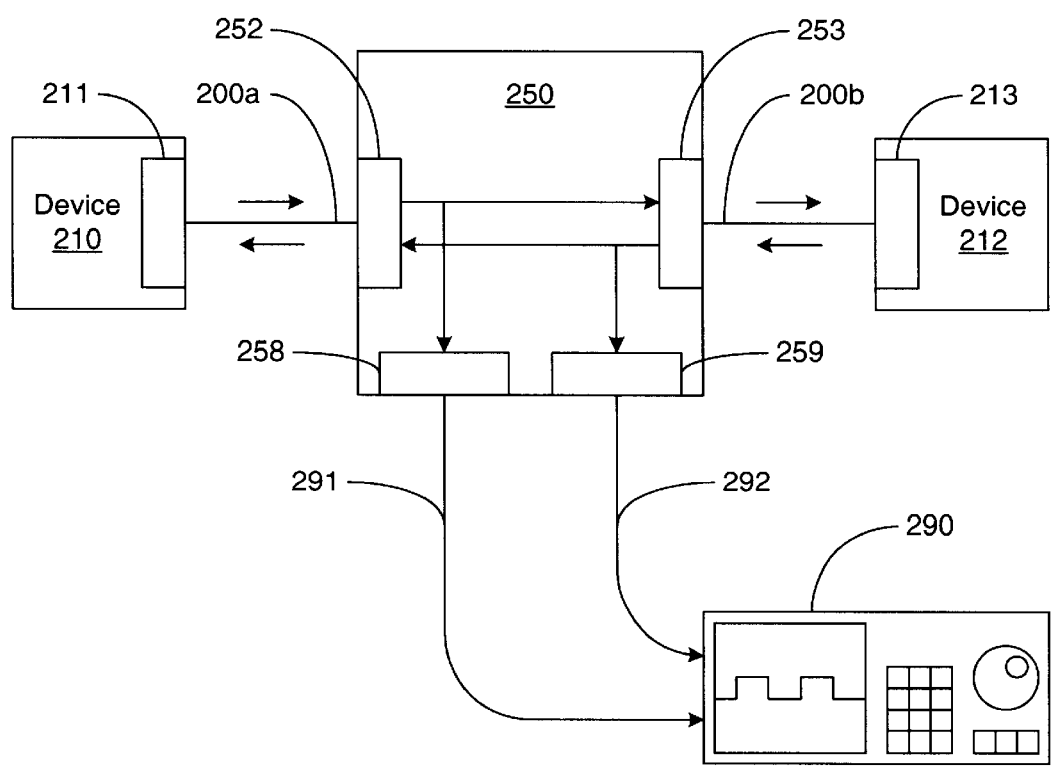
FIG. 2 is a simplified block diagram of one embodiment of an interposer device.

FIG. 2 depicts an embodiment of an interposer device. Interposer device 250 is interposed between busses 200a and 200b. Device 210 is coupled to bus 200a via interface 211, and device 212 is coupled to bus 200b via interface 213. Interposer device 250 is coupled to busses 200a and 200b via interfaces 252 and 253, respectively. Interposer device 250 is also coupled to lines 291 and 292 via interfaces 258 and 259, respectively. Lines 291 and 292 carry signals to diagnostics device 290. Interposer device 250 can be configured to transmit copies of data transmitted or received on either of interfaces 252 or 253 to lines 291 and 292 via interfaces 258 and 259. Diagnostics device 290 could be either a logic analyzer or bus analyzer of the variety commonly used in debugging busses, however, it will be understood that diagnostics device 290 could any of a variety of devices using signal inputs to aid in debugging busses.

In one embodiment, busses 200a and 200b are ternary logic busses that enable the substantially simultaneous bidirectional transfer of data to and from each of devices 210 and 212. In this embodiment, data is transferred on conductors on which the voltage varies between 3 different levels, as depicted in Table 1, depending on the logic level being transmitted on a given conductive line by devices 210 and 212.

TABLE 1

| output from device 210 | output from device 212 | resulting voltage level |
|---|---|---|
| logic 0 | logic 0 | low |
| logic 0 | logic 1 | half way between high and low |
| logic 1 | logic 0 | half way between high and low |
| logic 1 | logic 1 | high |

In this embodiment, busses 200a and 200b include at least one pair of conductors on which reference voltage levels of ¼ and ¾ of the high level are maintained for use by devices 210 and 212, and interposer device 250 in deriving the data received from other devices to which each is coupled by way of either bus 200a or 200b. In this embodiment, a device transmitting a high level on a conductor would use the reference voltage level at ¾ of the high level in determining whether another device coupled to the same conductor is transmitting a low or high level. Similarly, a device transmitting a low level on a conductor would use the reference voltage level at ¼ of the high level in determining whether another device coupled to the same conductor is transmitting a low or high level.

In another embodiment, busses 200a and 200b transfer data at speeds sufficiently high, or rely on differences between voltage levels that are sufficiently small, that it is not possible to attach probes to conductors of either bus 200a or 200b without altering the electrical characteristics of those conductors such that data integrity is adversely effected, or such that timing parameters required for normal operation of either bus 200a or 200b are violated. In still another embodiment, busses 200a and 200b are ternary logic busses enabling substantially simultaneous bidirectional transfers at speeds sufficiently high, or which rely on differences between voltage levels that are sufficiently small, that difficulties in deriving data being transferred and in preserving electrical characteristics are encountered when attaching probes to conductors of either bus 200a or 200b.

In one embodiment, interfaces 258 and 259 may be substantially similar in design and characteristics to interfaces 252 and 253. Interfaces 258 and 259 may be capable of being coupled to a ternary logic bus, but lines 291 and 292 may carry binary signals as a result of diagnostics device 290 not engaging in substantially simultaneous bidirectional transfers of data with interfaces 258 and 259. In other words, diagnostics device 290 does not transmit signals on conductors of lines 291 and 292 by which signals are received from data interfaces 258 and 259. In another embodiment, regardless of whether interfaces 258 and 259 are substantially similar in design and characteristics to interfaces 252 and 253, signals emanating from interfaces 258 and 259 may be amplified by a buffering device, not shown, interposed between interfaces 258 and 259 and lines 291 and 292.

Although FIG. 2 depicts the use of two interfaces and two lines in connecting interposer device 250 and diagnostics device 290, it will be understood that the quantity and nature of the coupling between interposer device 250 and diagnostics device 290 is not so limited.

Figure 3:
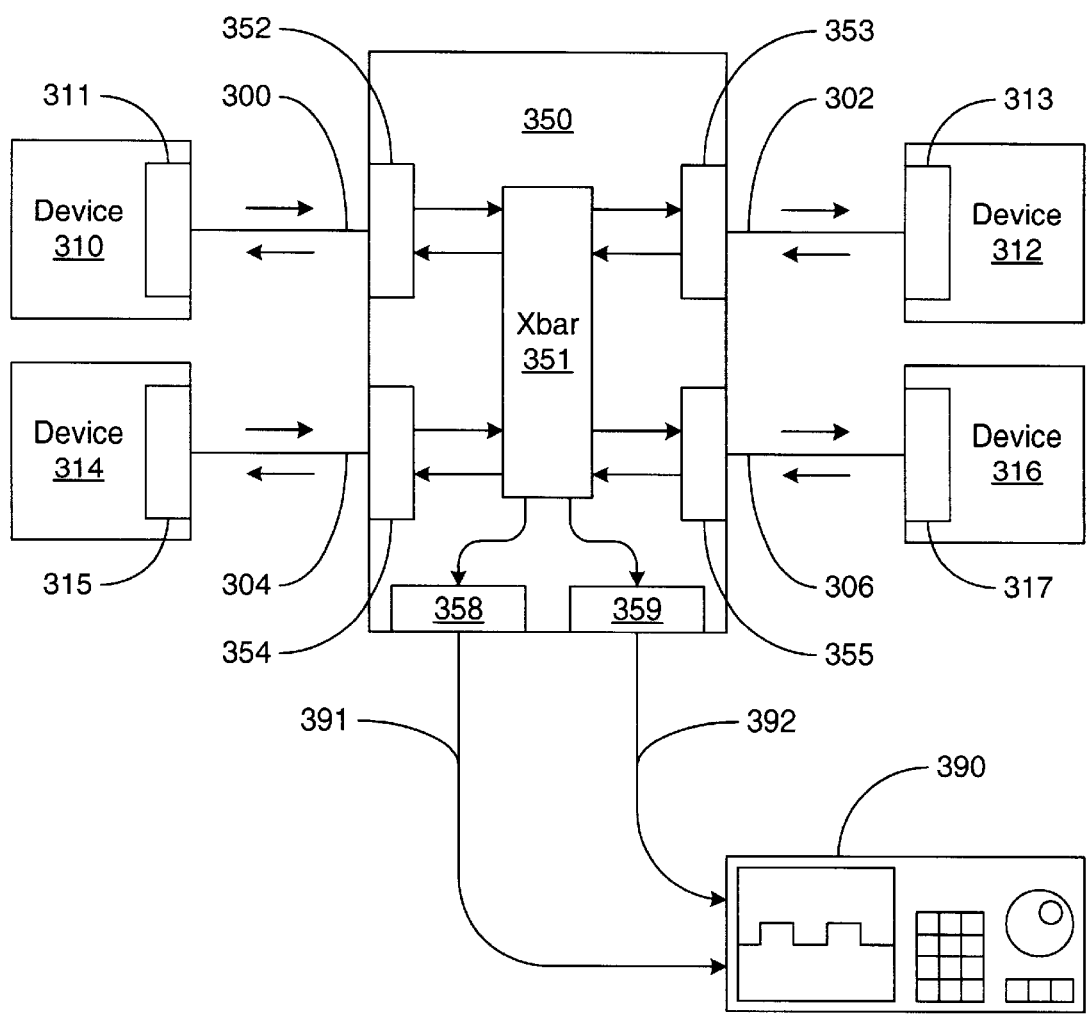
FIG. 3 is a simplified block diagram of one embodiment of a crosspoint device.

FIG. 3 depicts one embodiment of a crosspoint device. Crosspoint device 350 is coupled to busses 300, 302, 304 and 306, and to lines 391 and 392 by interfaces 352, 353, 354, 355, 358 and 359, respectively. Devices 310, 312, 314 and 316 are coupled to busses 300, 302, 304 and 306 by interfaces 311, 313, 315 and 317, respectively. Diagnostics device 390 is coupled to lines 391 and 392. Crosspoint device 350 includes crosspoint switch 351 which selectively connects two or more of interfaces 352–355 and 358–359, allowing data to be transferred between the various busses and lines to which crosspoint device 350 is coupled. Furthermore, crosspoint device 350 can be configured to transmit copies of data transmitted or received on any of interfaces 352-355 to interfaces 358 and 359 to be transmitted to diagnostics device 390 via lines 391 and 392.

In one embodiment, devices 310, 312, 314 and 316, along with crosspoint device 350, are components of a computer system. Devices 310, 312 and 314 could be a CPU, a random access storage device (RAM), and a graphics controller coupled to a display (not shown), respectively. Device 316 could be an I/O device such as disk controller or an I/O interface for such devices as a keyboard, mouse or printer (not shown). Alternatively, device 316 could be a bridge device providing access to another bus (not shown).

In one embodiment, busses 300, 302, 304 and 306 may be ternary logic busses using three voltage levels and a pair of voltage references to enable the substantially simultaneous bidirectional transfer of data as previously discussed for FIG. 2. In another embodiment, busses 300, 302, 304 and 306 transfer data at speeds sufficiently high or relying on differences between voltage levels that are sufficiently small that it is not possible to attach probes to conductors of busses 300, 302, 304 or 306 without altering the electrical characteristics of those conductors such that data integrity is adversely effected, or such that timing parameters required for normal operation are violated. In still another embodiment, at least one of busses 300, 302, 304 and 306 is a ternary logic bus enabling substantially simultaneous bidirectional transfers at speeds sufficiently high or relying on differences between voltage levels that are sufficiently small that difficulties in deriving data being transferred and in preserving electrical characteristics are encountered when attaching probes to conductors of that bus.

In one embodiment, interfaces 358 and 359 may be substantially similar in design and characteristics to interfaces 352 through 355. Interfaces 358 and 359 may be capable of being coupled to a ternary logic bus, but lines 391 and 392 may carry binary rather than ternary signals as a result of diagnostics device 390 not engaging in substantially simultaneous bidirectional transfers of data with interfaces 358 and 359. In other words, diagnostics device 390 does not transmit signals on conductors of lines 391 and 392 by which signals are received from data interfaces 358 and 359. In another embodiment, regardless of whether interfaces 358 and 359 are substantially similar in design and characteristics to interfaces 352 through 355, signals emanating from interfaces 358 and 359 may be amplified by a buffering device, not shown, interposed between interfaces 358 and 359 and lines 391 and 392.

Figure 4:
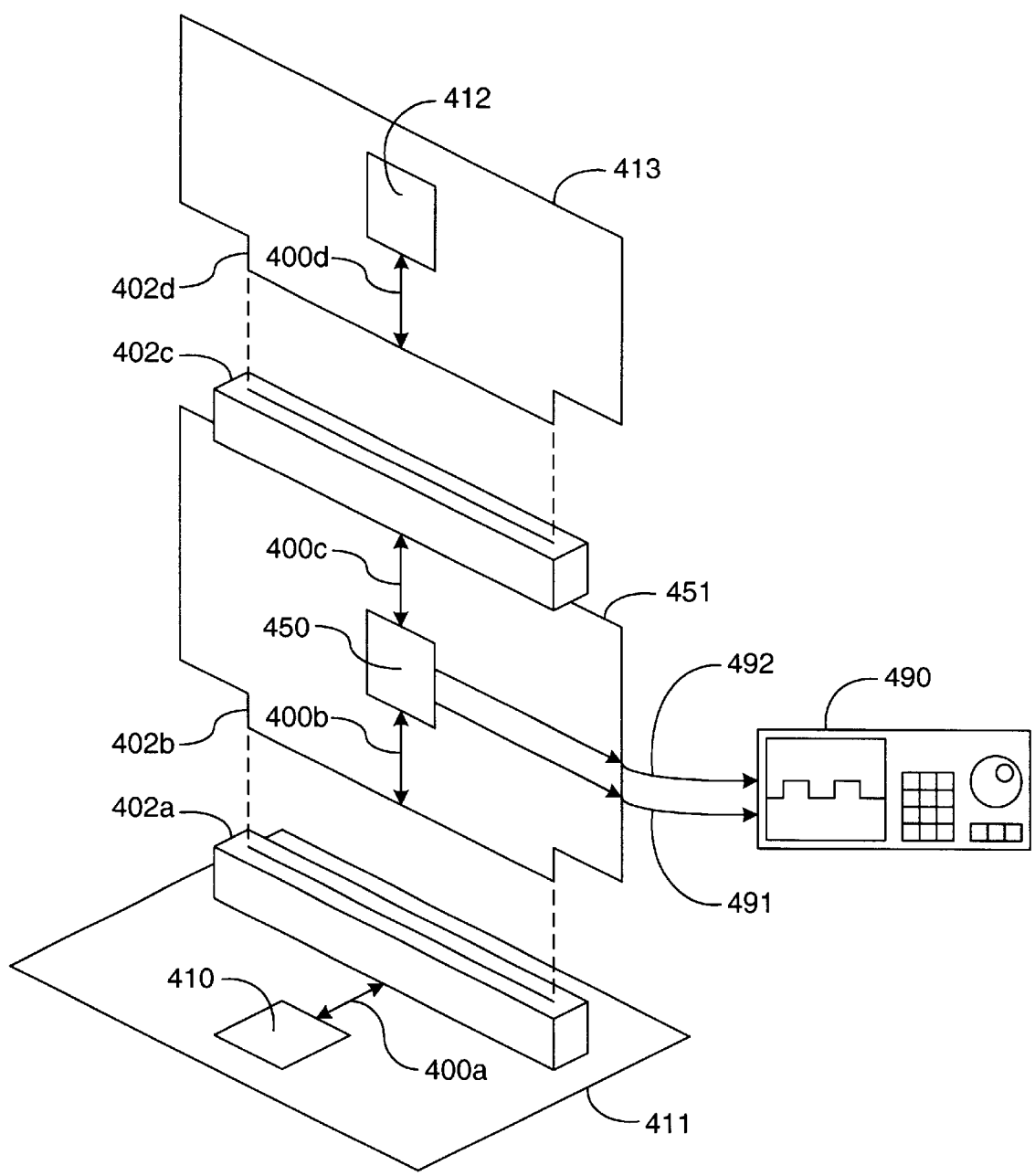
FIG. 4 is a simplified block diagram of one embodiment of an interposer board.

FIG. 4 depicts one embodiment of an interposer board. In typical use, edge tab 402d of circuit board 413 would be inserted into edge connector 402a of circuit board 411, thereby connecting busses 400a and 400d to form a single bus coupling device 410 of circuit board 411 to device 412 of circuit board 413. However, for debugging the bus formed between devices 410 and 412, interposer board 451 is interposed between circuit boards 411 and 413 such that edge tab 402d is inserted into edge connector 402c of interposer board 451, and edge tab 402b of interposer board 451 is inserted into edge connector 402a. In this way, bus 400a is connected to bus 400b, bus 400c is connected to bus 400d, and interposer device 450 is thereby interposed between devices 410 and 412.

In a manner similar to interposer device 250 of FIG. 2, above, interposer device 450 transfers data between busses 400b and 400c, thereby enabling transfers between bus 400a to which device 410 is coupled and bus 400d to which device 412 is coupled. Also in a manner similar to interposer device 250, interposer device 450 transmits copies of data transferred between busses 400b and 400c to lines 491 and 492, by which interposer device 450 is coupled to diagnostics device 490.

In one embodiment, busses 400a through 400d are ternary logic busses, using voltage three levels and a pair of voltage references to enable substantially simultaneous bidirectional transfers of data as earlier discussed, and as earlier shown by Table 1, above. In another embodiment, the rate at which data is transferred on busses 400a and 400d may be sufficiently high, or the differences relied upon between different voltage levels may be sufficiently small, that probes from diagnostics device 490 could not be directly coupled to conductors of any of busses 400a through 400d without adverse effects on electrical or timing characteristics of those conductors such that data integrity would be adversely effected. Indeed, the electrical or timing characteristics may be such that the lengths of the conductors of bus 400c or bus 400d may need to be kept to stringent minimums. In still another embodiment, busses 400a through 400d may be ternary logic busses on which data is transferred at such a rate as to also present these difficulties with the direct connection of probes.

Figure 5:
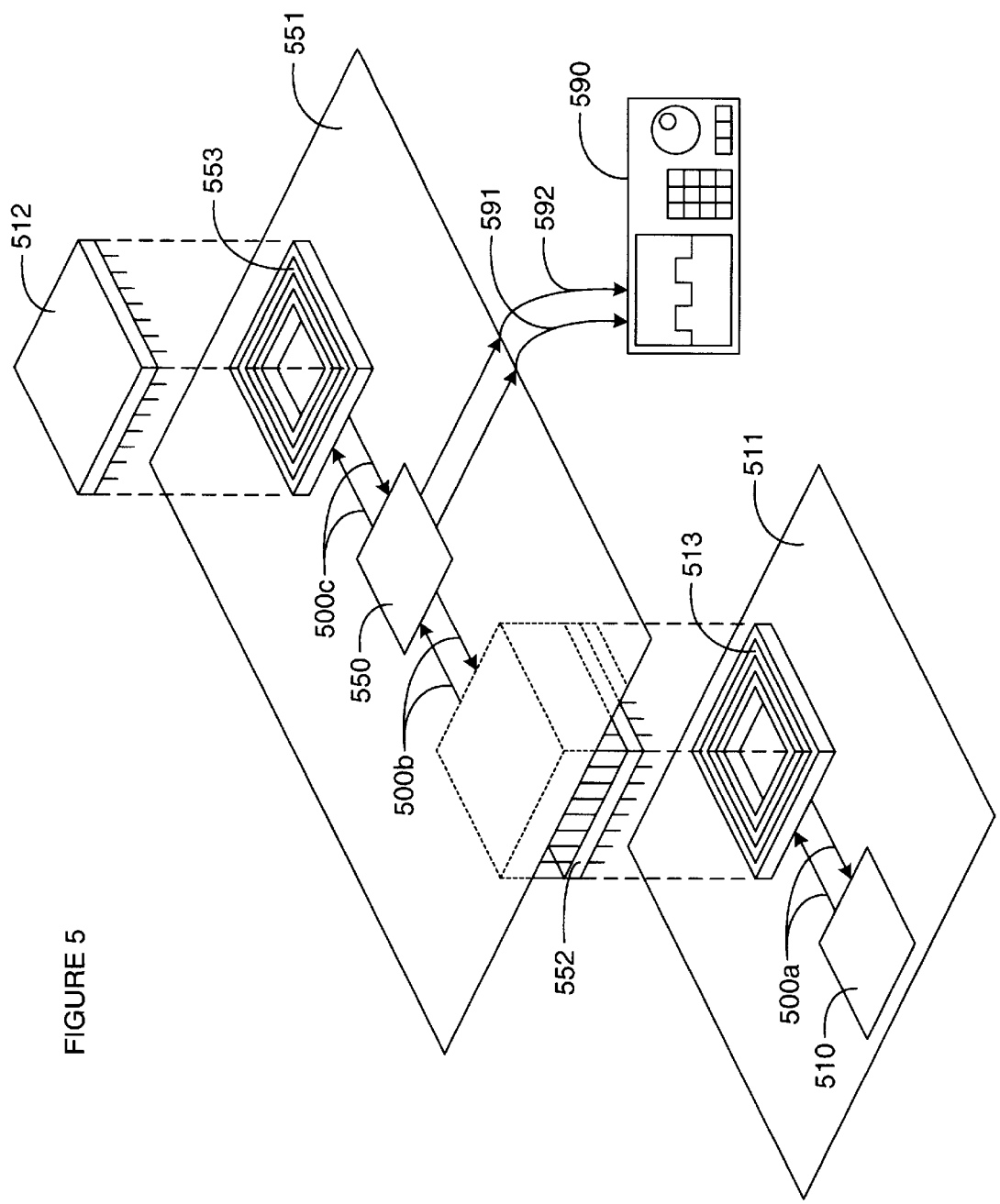
FIG. 5 is a simplified block diagram of another embodiment of an interposer board.

FIG. 5 depicts another embodiment of an interposer board. In typical use, device 512 would be connected to socket 513 of circuit board 511, thereby coupling devices 510 and 512 through bus 500a. However, for debugging bus 500a, interposer board 551 is interposed between device 512 and circuit board 511 such that device 512 is connected to socket 553 of interposer board 551, and pin connector 552 of interposer board 551 is connected to socket 513. In this way, bus 500a is connected to bus 500b, bus 500c is connected to device 512, and interposer device 550 is thereby interposed between devices 510 and 512. Lines 591 and 592 couple interposer device 550 to diagnostics device 590.

Figure 6:
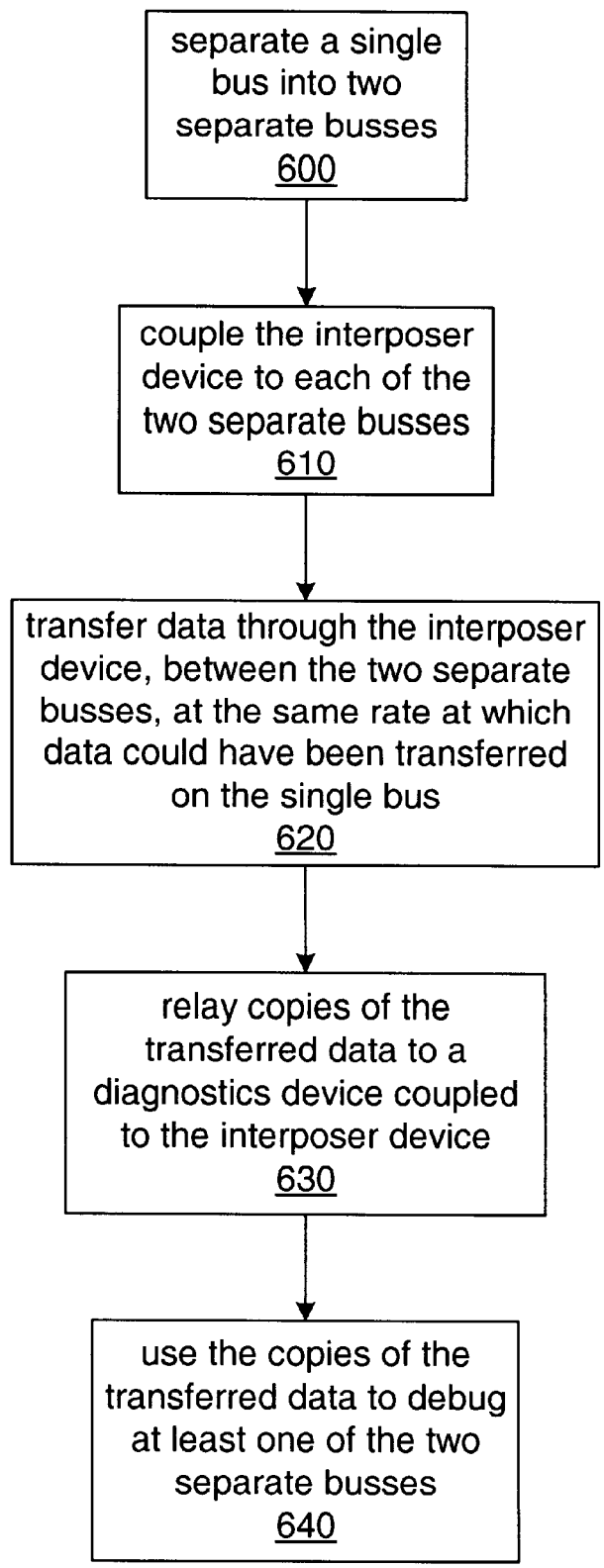
FIG. 6 is a flow chart of one embodiment of a method of debugging a bus.

FIG. 6 depicts one embodiment of a method of debugging a bidirectional bus. At 600, conductors of an existing bus are separated, creating two separate busses. At 610, an interposer device is coupled to separated conductors from each of the two separate busses, such that data can be transferred between the two separate busses by way of the interposer device. At 620, data is transferred between the two separate busses, through the interposer device, at a rate substantially similar to the rate at which it was possible to transfer the same data across the original bidirectional bus. At 630, copies of the data transferred between the two separate busses is relayed to a diagnostics device attached to the interposer device. At 640, the copies of the data transferred between the two separate busses are used to debug at least one of the two separate busses.

Figure 7:
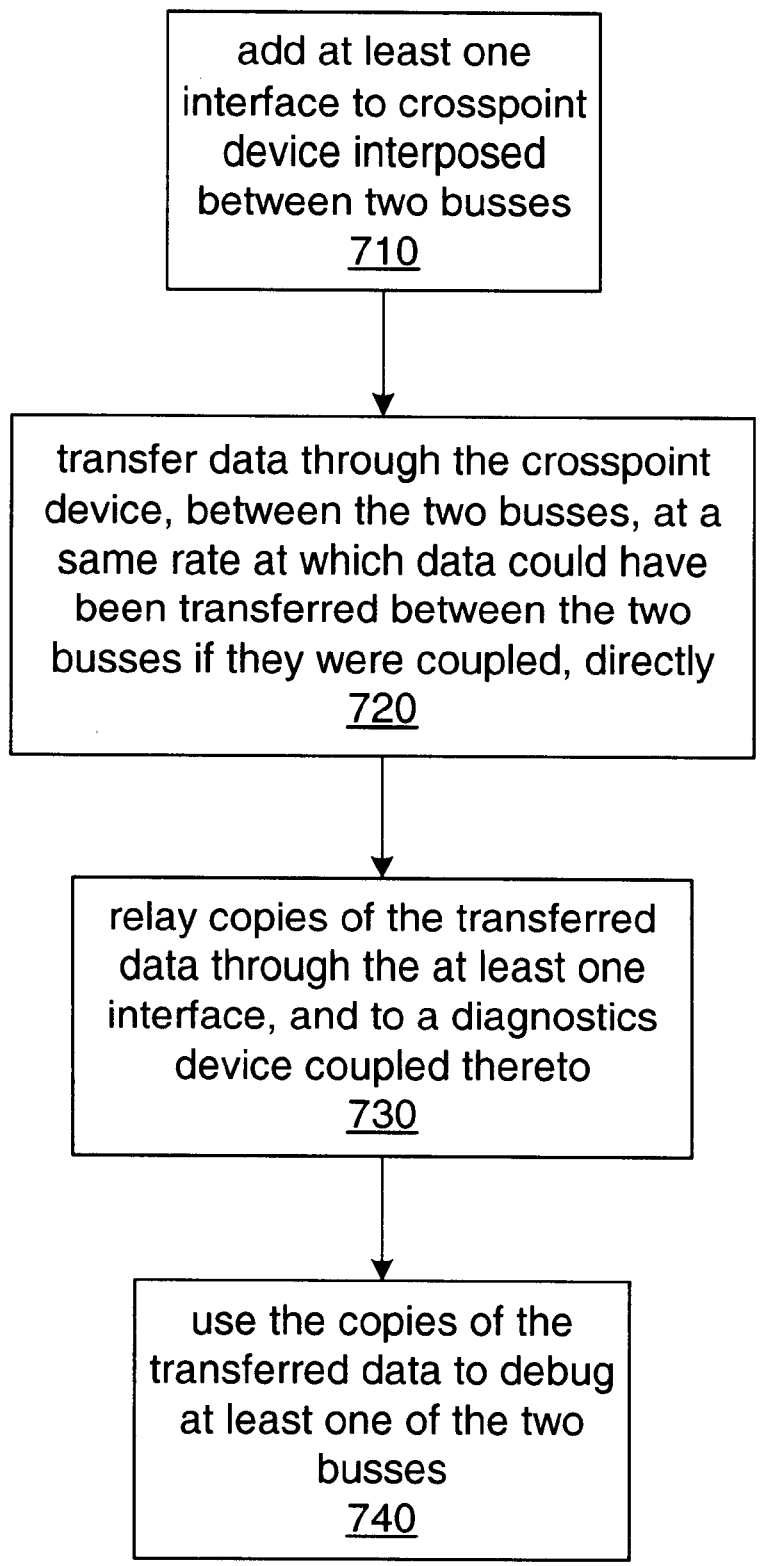
FIG. 7 is a flow chart of another embodiment of a method of debugging a bus.

FIG. 7 depicts another embodiment of a method of debugging a bidirectional bus. At 710, an interface is added to a crosspoint device that is coupled to conductors from each of two busses, such that data can be transferred between the two busses by way of the crosspoint device. At 720, data is transferred between the two busses, through the crosspoint device, at a rate substantially similar to the rate at which it would have been possible to transfer the same data across the two busses were they coupled directly to each other. At 730, copies of the data transferred between the two busses is relayed to a diagnostics device attached to the crosspoint device. At 740, the copies of the data transferred between the two busses are used to debug at least one of the two busses.

The invention has been described in conjunction with the preferred embodiment. It is evident that numerous alternatives, modifications, variations and uses will be apparent to those skilled in the art in light of the foregoing description. It will be understood by those skilled in the art, that the present invention may be practiced in support of other combinations of functions in a computer system.

What is claimed is:

1. A method for debugging a bidirectional bus, comprising:
   separating the conductors of a bidirectional bus so as to create two separate busses;
   coupling an interposer device to transmit copies of signals transferred on a bus to both of the two separate busses;
   transferring signals between the two separate busses through the interposer device at a rate substantially similar to the rate at which the same signals are transferable across the bidirectional bus;
   transmitting copies of signals transferred between the two separate busses from the interposer device to a diagnostics device attached to the interposer device; and
   using the transmitted copies of transferred signals to debug at least one of the two separate busses.

2. The method of claim 1, wherein the transferring of signals between the two separate busses comprises transferring signals substantially simultaneously using ternary logic.

3. The method of claim 1, wherein the transferring of signals between the two separate busses comprises transferring signals at a rate sufficiently high as to preclude the use of diagnostics equipment utilizing the attachment of probes to the conductors of a bus.

4. The method of claim 1, wherein the transferring of signals between the two separate busses comprises representing different logic levels using different voltage levels between at least two of which the difference in voltage is sufficiently small as to preclude the use of diagnostics equipment utilizing the attachment of probes to the conductors of a bus.

5. The method of claim 1, wherein coupling an interposer device to both of the two separate busses comprises coupling each of the two separate busses to an integrated circuit that includes interface logic to couple the integrated circuit with each of the two separate busses.

6. A method for debugging a bidirectional bus, comprising:
- adding at least one interface to a crosspoint device coupled to a plurality of busses;
- transferring signals through the crosspoint device between at least two of the busses coupled to the crosspoint device at a rate substantially similar to the rate at which the same signals are transferable across a single one of the at least two busses;
- transmitting copies of signals transferred between the at least two busses through the at least one interface to a diagnostics device coupled to the at least one interface; and
- using the transmitted copies of transferred signals to debug at least one of the at least two busses.

7. The method of claim 6, wherein the transferring of signals between the at least two busses comprises transferring signals substantially simultaneously using ternary logic.

8. The method of claim 6, wherein the transferring of signals between the at least two busses comprises transferring signals at a rate sufficiently high as to preclude the use of diagnostics equipment utilizing the attachment of probes to the conductors of at least one of the at least two busses.

9. An apparatus for debugging a bidirectional bus, comprising:
- a plurality of bus interfaces, each of which is capable of being coupled to a bus;
- logic to buffer signals between at least two of the plurality of bus interfaces;
- at least one diagnostics interface; and
- logic to copy signals being buffered between the at least two of the plurality of bus interfaces to the at least one diagnostics interface.

10. The apparatus of claim 9, wherein at least one diagnostics device is coupled to the at least one diagnostics interface.

11. The apparatus of claim 9, wherein each of the at least two busses is a ternary logic bus using 3 voltage levels to enable substantially simultaneous bidirectional transfers of data.

12. The apparatus of claim 9, wherein data is transferred on each of the at least two busses at a rate sufficiently high as to preclude the use of diagnostics devices requiring a direct connection to the conductors of either of the at least two busses.

13. The apparatus of claim 9, wherein the data is transferred on each of the at least two busses by representing different logic levels with different voltage levels between at least two of which the difference in voltage is sufficiently small as to preclude the use of diagnostics equipment utilizing the attachment of probes to the conductors of a bus.

14. The apparatus of claim 9, wherein the at least two busses are configured to be coupled to each other.

15. The apparatus of claim 14, wherein connectors are coupled to each of the at least two busses, and the at least two busses are configured to be coupled to each other by coupling the connectors.

16. The apparatus of claim 15, wherein at least two of the interfaces are coupled to connectors, and the apparatus is interposed between devices by coupling connectors of the apparatus to connectors coupled to each of the at least two busses.

17. The apparatus of claim 9, wherein the at least one diagnostics interface is substantially similar in design to one of the plurality of bus interfaces.

18. An apparatus for selectively coupling a plurality of busses comprising:
- a plurality of bus interfaces for coupling the apparatus to the plurality of busses;
- logic to selectively couple at least two busses coupled to the interfaces such that data may be transferred between the at least two busses;
- at least one diagnostics interface coupling the apparatus to a diagnostics device; and
- logic for transmitting copies of data transferred between the at least two busses to the diagnostics device by way of the at least one diagnostics interface coupling the apparatus.

19. The apparatus of claim 18, wherein at least one of the plurality of busses is a ternary logic bus using 3 voltage levels to enable substantially simultaneous bidirectional transfers of data.

20. The apparatus of claim 18, wherein data is transferred on at least one of the plurality of busses at a rate sufficiently high as to preclude the use of diagnostics devices requiring a direct connection to the conductors of the at least one bus.

21. The apparatus of claim 18, wherein the data is transferred on at least one of the plurality of busses by representing different logic levels with different voltage levels between at least two of which the difference in voltage is sufficiently small as to preclude the use of diagnostics equipment utilizing the attachment of probes to the conductors of a bus.

22. The apparatus of claim 18, wherein the at least one diagnostics interface is substantially similar in design to one of the plurality of bus interfaces.

23. A computer system, comprising:
- at least one CPU;
- at least one random access storage device;
- at least one I/O device;
- a plurality of busses; and
- at least one crosspoint device including logic for interfacing to and selectively coupling the plurality of busses such that data may be transferred between the plurality of busses, and including at least one diagnostics interface for coupling the crosspoint device to at least one diagnostic device.

24. The computer system of claim 23, wherein at least one of the plurality of busses is a ternary logic bus using 3 voltage levels to enable substantially simultaneous bidirectional transfers of data.

25. The computer system of claim 23, wherein data is transferred on at least one of the plurality of busses at a rate sufficiently high as to preclude the use of diagnostics devices requiring a direct connection to the conductors of the at least one bus.

26. The computer system of claim 23, wherein the data is transferred on at least one of the plurality of busses by representing different logic levels with different voltage levels between at least two of which the difference in voltage is sufficiently small as to preclude the use of diagnostics equipment utilizing the attachment of probes to the conductors of a bus.

27. The computer system of claim 23, wherein the at least one diagnostics interface is substantially similar in design to the interfacing logic used to couple at least one of the plurality of busses to the crosspoint device.

* * * * *